W. F. HOBBS.
NAIL PULLER.
APPLICATION FILED JAN. 25, 1908.

900,016.

Patented Sept. 29, 1908.

Witnesses:
H. A. Lamb.
S. W. Atherton.

Inventor
Willis F. Hobbs
By Attorney
A. M. Wooster

UNITED STATES PATENT OFFICE.

WILLIS F. HOBBS, OF BRIDGEPORT, CONNECTICUT, ASSIGNOR TO THE BRIDGEPORT HARDWARE MANUFACTURING CORPORATION, OF BRIDGEPORT, CONNECTICUT, A CORPORATION OF CONNECTICUT.

NAIL-PULLER.

No. 900,016.     Specification of Letters Patent.     Patented Sept. 29, 1908.

Application filed January 25, 1908. Serial No. 412,597.

*To all whom it may concern:*

Be it known that I, WILLIS F. HOBBS, a citizen of the United States, residing at Bridgeport, county of Fairfield, State of Connecticut, have invented a new and useful Nail-Puller, of which the following is a specification.

This invention has for its object to provide a simple and inexpensive tool for pulling nails, as in opening boxes, and other general uses.

With this and other ends in view the invention consists in certain improved details of construction, which will be hereinafter set forth and then specifically pointed out in the claims hereunto appended.

Figure 1:
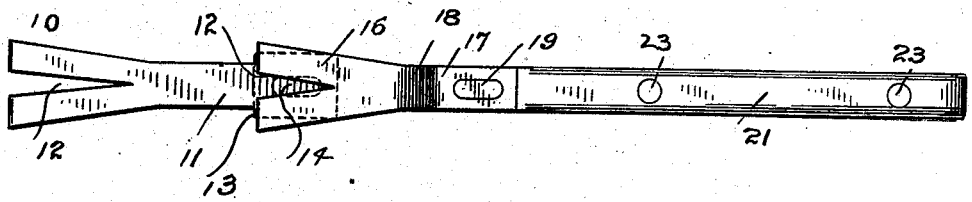
Figure 2:
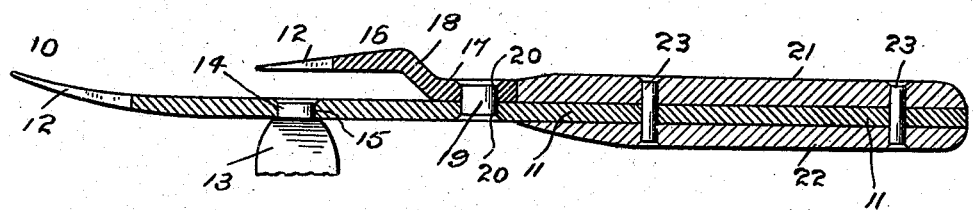

In the accompanying drawing forming a part of this specification, Figure 1 is a plan view of my novel nail puller; and Fig. 2 is a longitudinal section thereof.

My novel tool comprises inner and outer claws both projecting in the same direction and in nearly the same plane, a hammer and a handle.

10 denotes the outer claw which is formed at the end of a bar of metal, indicated by 11, which extends the entire length of the tool. The claw is formed by flattening the metal of the bar, tapering the opposite sides to a dull edge, tapering the edges thereof outward and providing the usual V-shaped opening, indicated by 12.

It is an important feature of the invention that in the position shown in Fig. 2, the outer claw is inclined upward from the horizontal plane so that its tip is in substantially the same plane as the inner claw presently described. Back of the outer claw upon the under side of the bar is a hammer 13. This hammer is a forged block and is provided with a shank 14 which is elongated in cross section in the direction of the length of the bar and engages an elongated opening 15 in the bar, the shank serving as a rivet for the hammer and being headed down upon the upper side of the bar, and the elongation of said rivet preventing the hammer from turning or becoming loose.

16 denotes the inner claw, which is provided at its inner end with a shank indicated by 17, the claw being offset from the shank as at 18 and projected forward in the same direction as the outer claw, the offset being slight however so as not to raise the inner claw much above the shank of the outer claw. The inner claw is formed by flattening and tapering the metal in the same manner the outer claw is formed and is likewise provided with a V-shaped opening 12. Shank 17 is secured to bar 11 by means of a rivet 19 which is elongated in cross section, passes through correspondingly-shaped holes 20 in the bar and shank and is headed down at both ends, the elongation of the rivet preventing turning or loosening of the shank. The handle is preferably formed by strips of wood, indicated by 21 and 22, lying respectively above and below the rear end of the bar 11 and secured thereto by rivets 23. The forward end of wooden strip 21 is shown as abutting against the rear end of shank 17, and the forward end of strip 22 is shown as tapered down to the plane of bar 11. The edges of strips 21 and 22 are preferably rounded for convenience in handling.

The ordinary operation in opening a box is as follows: The cover is started by forcing the outer claw between the cover and the top of the box and prying the cover upward. The claw may or may not straddle the nail. The cover is then struck a blow with the hammer, which drives the cover downward leaving the heads of the nails above the cover. Either claw may then be used, as most convenient, to draw the nails. I preferably use the inner claw to draw the nails, using the tip of the outer claw as a fulcrum, for the reason that the curvature of the outer claw which is now turned downward gives the tip a position where it will take a positive grip on the cover and prevent the tool from slipping. While the hold of the inner claw on the nail is positive, the nail is not drawn downward into the slot and locked there but is drawn straight out without bending so that it may be used over again, and drops easily out of the claw when drawn from the cover. This action is due to the fact that the tip of the outer claw is substantially in the same plane as that in which the inner claw lies when in use.

Any style of handle may be used although I preferably use a handle formed from two strips of wood riveted to bar 11, as shown in the drawing.

Owing to the fact that the tip of the outer claw is substantially in line with the plane of the inner claw, and that the outer claw is formed to operatively engage a nail when the inner claw is uppermost and the inner claw is formed to operatively engage a nail when the tip of the outer claw engages the surface of the article from which the inner claw is to pull a nail, the device is adapted to pull nails without any liability of such nails becoming wedged in either claw. This is because the outer claw can be first used to start a nail, and then the tool is quickly reversed or turned upside down and the inner claw is then engaged with the head of the nail after which the tip of the outer claw acts as a positive fulcrum which so engages the top of the box that it can not slip. The distance between the two claws is such that the inner claw will then pull the nail almost straight upward without tendency to slip or wedge on the nail. In other words the tip of the outer claw acts as a brake to prevent slipping during the pulling of the nail by the inner claw.

The location of the hammer head is such that it acts as a positive fulcrum when the front claw is being used for starting the nail.

The strips of wood which cover the two sides of the handle end of the shank add stiffness and rigidity to the tool and make it possible to produce a strong and serviceable tool of much lighter weight than could be produced if made of solid steel.

Owing to the fact that the inner claw is separate from and then attached to the bar one end of which has the outer claw, it is possible to make the tool economically from a high grade of steel because each part can be forged and then end-tempered separately before assembling, whereas, if made of one piece, they would have to be hardened and tempered as a whole, and it would be impossible to produce a tool with each part properly tempered to stand severe strain, owing to the fact that all the working parts of a first class tool of this character should first be hardened in the usual manner and afterwards the temper drawn by heating to the proper degree of heat.

Having thus described my invention I claim:

1. A nail puller comprising an outer claw formed at the end of a substantially straight bar and an inner claw projected forward in the same direction as the outer claw and having an offset shank separate from but secured to the bar, the tip of the outer claw being deflected to substantially the plane of the inner claw, the outer claw being formed to operatively engage a nail when the inner claw is uppermost and the inner claw being formed to operatively engage a nail when the tip of the outer claw acts as a fulcrum on the surface of the article from which the inner claw is to pull the nail.

2. A nail puller comprising an outer claw formed at the end of a substantially straight bar and an inner claw projected forward in the same direction as the outer claw and having an offset shank separate from but secured to the bar, the tip of the outer claw being deflected to substantially the plane of the inner claw, the outer claw being formed to operatively engage a nail when the inner claw is uppermost and the inner claw being formed to operatively engage a nail when the tip of the outer claw acts as a fulcrum on the surface of the article from which the inner claw is to pull the nail, and a fulcrum projection secured to said bar at a distance from its claw end substantially equal to the distance between the two claws, said fulcrum projecting from the face of the bar opposite that to which the inner claw is attached.

3. A nail puller comprising an outer claw formed at the end of a substantially straight bar and an inner claw projecting forward in the same direction as the outer claw and having an offset shank separate from but secured to the bar, the tip of the outer claw being deflected to substantially the plane of the inner claw, the outer claw being formed to operatively engage a nail when the inner claw is uppermost and the inner claw being formed to operatively engage a nail when the tip of the outer claw acts as a fulcrum on the surface of the article from which the inner claw is to pull the nail, the handle end of the bar being flat, and strips of wood on opposite faces of the handle end of the bar and riveted thereto, one of said strips abutting against the shank of the inner claw.

In testimony whereof I affix my signature, in presence of two witnesses.

WILLIS F. HOBBS.

Witnesses:
A. M. WOOSTER,
S. W. ATHERTON.